United States Patent [19]
MacElwee et al.

[11] Patent Number: 5,703,980
[45] Date of Patent: Dec. 30, 1997

[54] METHOD FOR LOW-LOSS INSERTION OF AN OPTICAL SIGNAL FROM AN OPTICAL FIBRE TO A WAVEGUIDE INTEGRATED ON TO A SEMICONDUCTOR WAFER

[75] Inventors: Thomas MacElwee, Nepean; Stephen J. Kovacic, Kanata; Jugnu J. Ojha, Oakville, all of Canada

[73] Assignee: Northern Telecom, Montreal, Canada

[21] Appl. No.: 710,775

[22] Filed: Sep. 20, 1996

[51] Int. Cl.⁶ .................................................. G02B 6/30
[52] U.S. Cl. ........................... 385/49; 385/50; 385/30; 385/9
[58] Field of Search ......................... 385/49, 50, 30, 385/9, 31, 122, 123, 129

[56] References Cited

U.S. PATENT DOCUMENTS

| | | | |
|---|---|---|---|
| 4,784,454 | 11/1988 | Dyott | 385/49 X |
| 5,199,087 | 3/1993 | Frazier | 385/14 |
| 5,360,982 | 11/1994 | Venhuizen | 385/14 |
| 5,384,282 | 1/1995 | Shiba et al. | 437/90 |

OTHER PUBLICATIONS

G.G. Goetz, et al., "Heterostructures By Generalized Bonding Techniques", 1990, Proceedings of the Electromechanical Society, Montreal, pp. 247–251 No Month.

*Primary Examiner*—Phan T. H. Palmer
*Attorney, Agent, or Firm*—Foley & Lardner

[57] ABSTRACT

A method and apparatus are provided for coupling light from a fiber to a waveguide on an OEIC (optoelectronic integrated circuit). The region of the fiber to be connected is made into a D-fiber by removing a portion of its cladding. The flat surface is fused to a silicon dioxide coated portion of the waveguide. The light in the fiber is evanescently coupled into the waveguide on the OEIC which is typically a planar or channel waveguide.

31 Claims, 7 Drawing Sheets

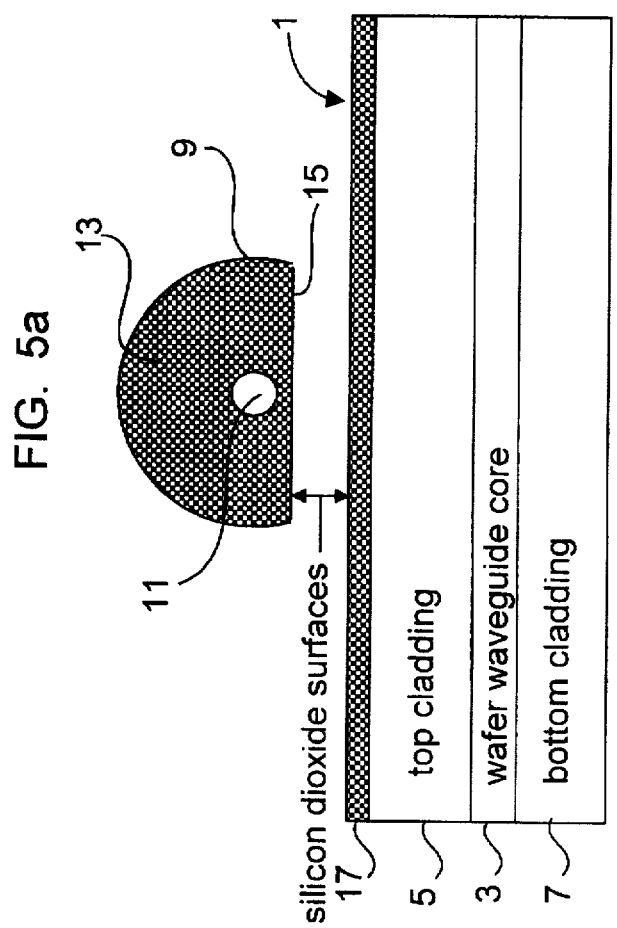
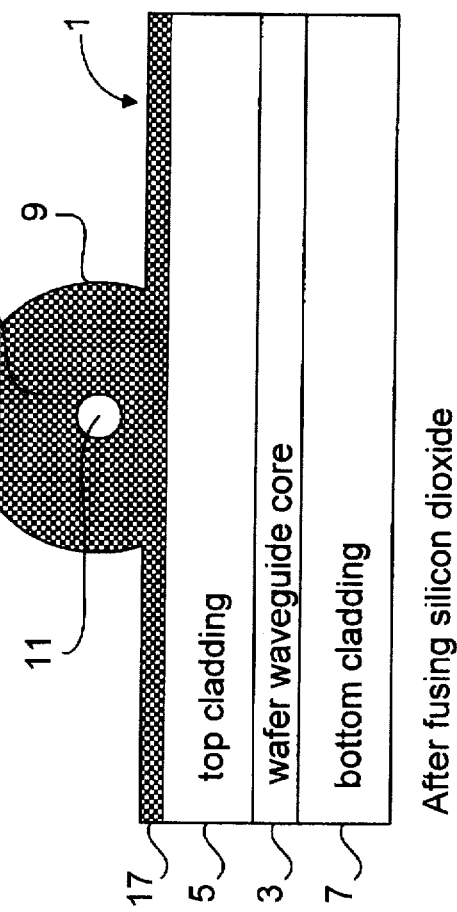

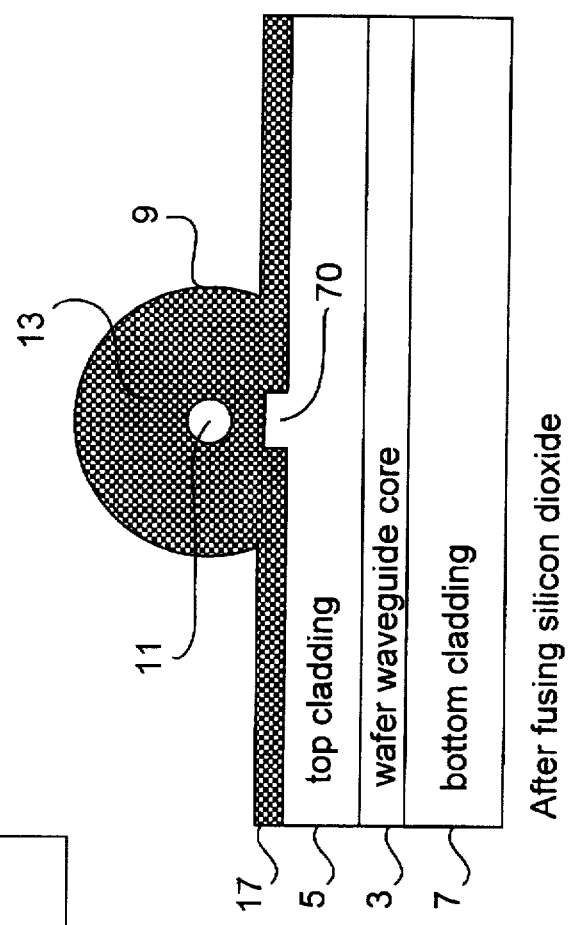
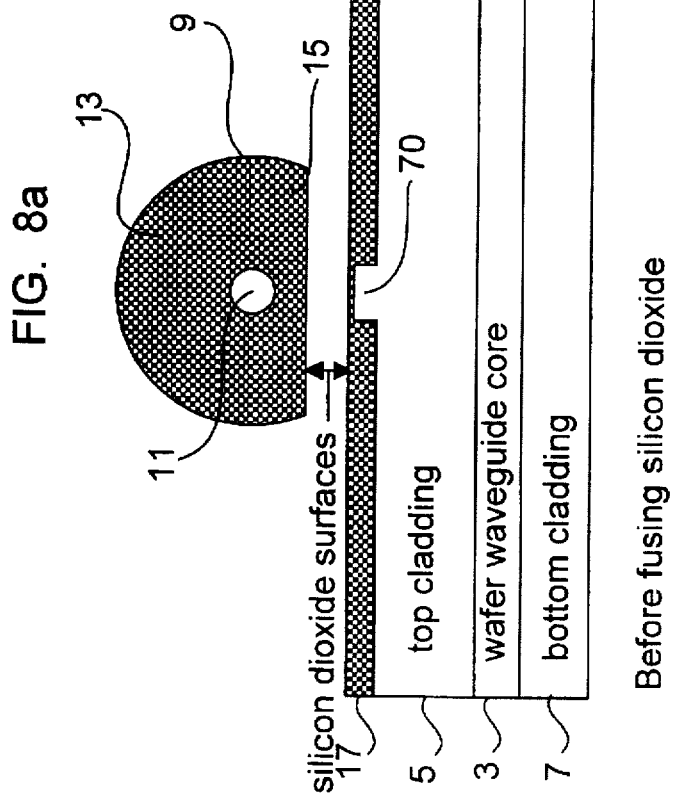

METHOD FOR LOW-LOSS INSERTION OF AN OPTICAL SIGNAL FROM AN OPTICAL FIBRE TO A WAVEGUIDE INTEGRATED ON TO A SEMICONDUCTOR WAFER

FIELD OF THE INVENTION

This invention relates to a method of connecting an optical fiber to a waveguide integrated onto a semiconductor wafer.

BACKGROUND OF THE INVENTION

Efficient coupling of light from an optical fiber to opto-electronic elements integrated onto a wafer is of paramount importance to preserve signal strength and establish connectivity. Integrating optical and electrical components onto a single substrate creates an optoelectronic integrated circuit (OEIC). In some manner, the lightwave signal in the fiber, which carries information from other system blocks, must be brought into the OEIC for further processing. In addition, a mechanism is required to couple into a fiber those light signals which are generated within the OEIC. In this manner, communication between the OEIC and other system blocks through optical fibers is made possible.

A number of methods are currently used to couple light from a fiber to an OEIC. For example, consider coupling light from a single-mode fiber to a slab waveguide, as seen in FIG. 1. Typically, a mechanical assembly is used to position a cleaved fiber relative to the waveguide in such a manner that light from the fiber couples to the waveguide directly. This method is commonly referred to as edge coupling. The difficulties associated with this technique include 1) positioning the fiber and maintaining the fiber position during the attachment process, 2) fixing the fiber into position for a long period of time and in a manner which is insensitive to thermal expansion or decomposition of the assembly elements, and 3) cleaving the fiber and the OEIC to provide a pair of optically flat coupling facets. These are all difficult operations which profoundly affect manufacturability and reliability of the coupling scheme.

Another existing technique, referred to as the v-groove method, brings the fiber directly in contact with the OEIC by positioning the fiber in a v-shaped groove made in the wafer. The v-groove is etched such that the core of the fiber lies at a specific height above the wafer when the fiber is placed in the groove. However, again positioning accuracy and fixing of the fiber are problematic.

U.S. Pat. No. 5,199,087 to Frazier discloses a technique for connecting a waveguide through a filament to a light detecting or emitting device in an integrated circuit chip. One end of the filament is aligned with the waveguide and a spherical lens is formed at the other end of the filament and this spherical lens is then fused to a silicon dioxide layer above the light detecting or emitting device. This technique is not suggested for connecting the filament to a waveguide which forms part of the integrated circuit chip.

In all of these methods, light is directly coupled from the core of the fiber into the core of the waveguide, resulting in stringent tolerances for accurate placement of the fiber. Because of this, a major cost today in manufacturing opto-electronic systems is in achieving accurate alignment of the fiber and waveguide.

SUMMARY OF THE INVENTION

An object of the invention is to provide a new technique which establishes optical signal coupling between a fiber and an OEIC in a manner which permits ease of positioning and fixing of the fiber.

According to a first broad aspect, the invention provides an optically coupled arrangement comprising a waveguide on an opto-electronic integrated circuit, the waveguide having a core, a first cladding underlying the core and a second cladding overlying the core, the second cladding having a first coupling surface; a fiber having a core and a cladding and having a portion of the cladding removed to form a second coupling surface, the second coupling surface being held in contact with the first coupling surface; whereby light propagating in either of the fiber or the waveguide is evanescently coupled between the fiber and the waveguide.

According to another broad aspect, the invention provides a method of making an optical coupling between a) an optical waveguide on an opto-electronic integrated circuit having a core, a first cladding underlying the core and a second cladding overlying the core, the second cladding having a first coupling surface; and b) an optical fiber having a core and a cladding; comprising the steps of: removing a portion of the cladding of the fiber along its length to form a second coupling surface; attaching the fiber to the waveguide such that the first coupling surface is held in contact with the second coupling surface.

BRIEF DESCRIPTION OF THE DRAWINGS

The invention will now be described in further detail with reference to the attached drawings in which:

FIG. 2b is a front view of the D-fiber of FIG. 2a;

FIGS. 5a and 5b are cross-sectional views of the D-fiber and waveguide of FIG. 4 before and after fusing together of the silica and silicon dioxide surfaces;

FIGS. 8a and 8b are cross-sectional views of the D-fiber and channel waveguide of FIG. 7 before and after fusing together of the silica and silicon dioxide surfaces.

FIG. 1 shows a coupling scheme according to one prior art technique. Shown is a planar waveguide 1 having a core 3 and two cladding layers 5,7. Also shown is a fiber 9 having a core 11 and cladding layer 13. The fiber has an index of refraction which varies from the center of the fiber to its surface so that optical confinement of the light (of particular wavelength) to the core is achieved. The illustrated fiber is a step index fiber in which there is a step decrease in the index of refraction in the cladding with respect to that of the core. The fiber may alternatively be a graded index fiber in which the index of refraction decreases continuously from a maximum located at the center of the fiber. The fiber may, for example, consist of silica cladding with a doped silica core. The core/cladding of the planar waveguide is made of conventional materials such as glass/doped glass, combinations of group III-V compounds such as GaAs/AlGaAs or InGaAsP/InP, or with more recently suggested silicon alloy materials such as SiGe/Si. Depending on the materials chosen, the core of the waveguide has a predetermined increase in the index of refraction with respect to the cladding layers.

Figure 1:
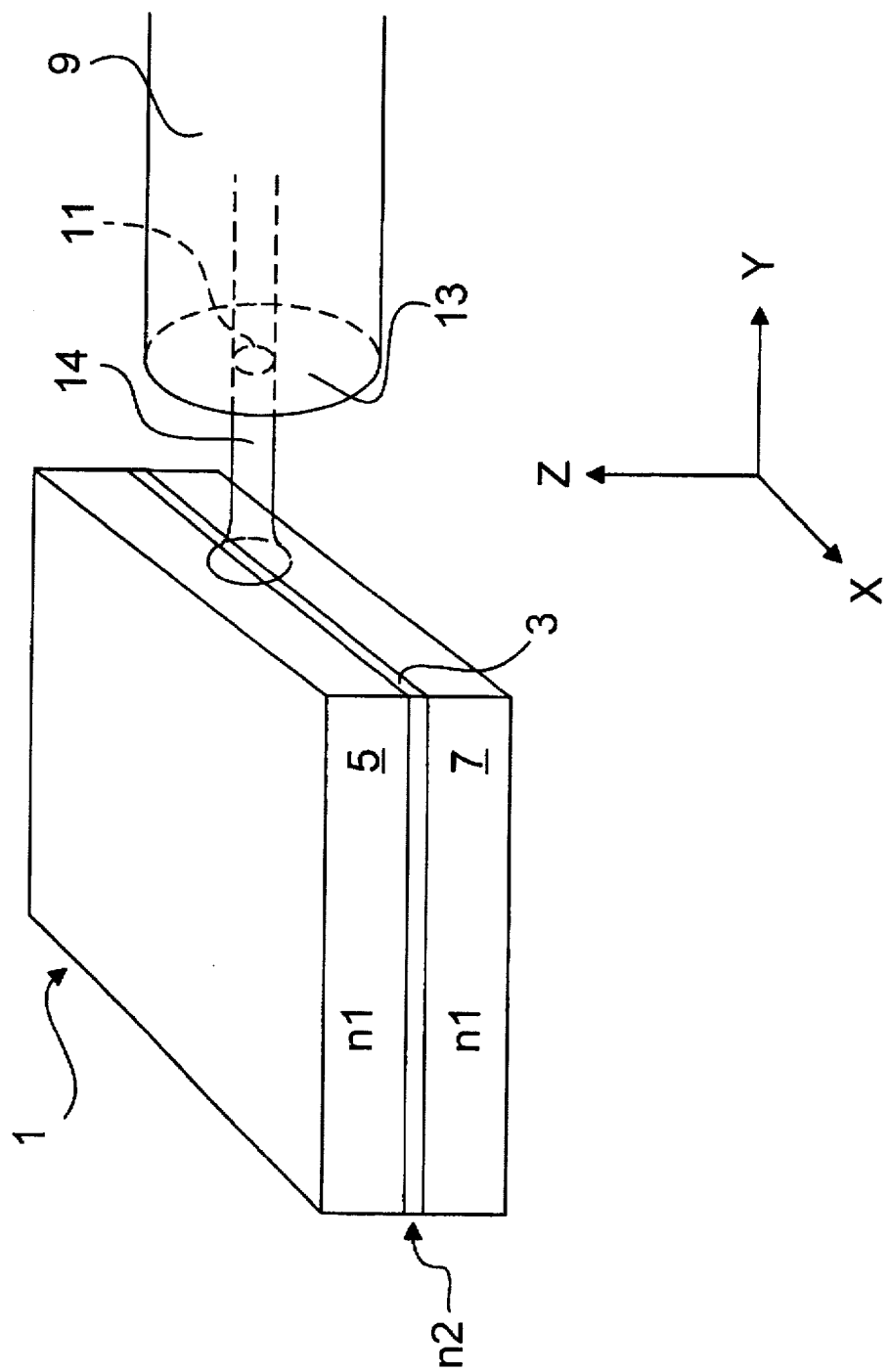
FIG. 1 is an isometric view of a fiber being coupled to a planar optical waveguide according to a prior art method.

In order to couple light from the core 11 of the fiber 9 to the core 3 of the waveguide 1, a cleaved end of the fiber is positioned a short distance from the waveguide so as to avoid scratching of the respective cores, with the core of the fiber aligned with the core of the waveguide. This allows the propagation of light directly from the core 11 of the fiber 9 into the core 3 of the planar waveguide 1. The spacing between the end of the fiber 9 and the waveguide 1 is shown greatly exaggerated and the light propagating from the fiber is illustrated as beam 14. Accurate positioning of the fiber in x,y, and z dimensions is required. This is very difficult to achieve in practice.

Figure 2A:
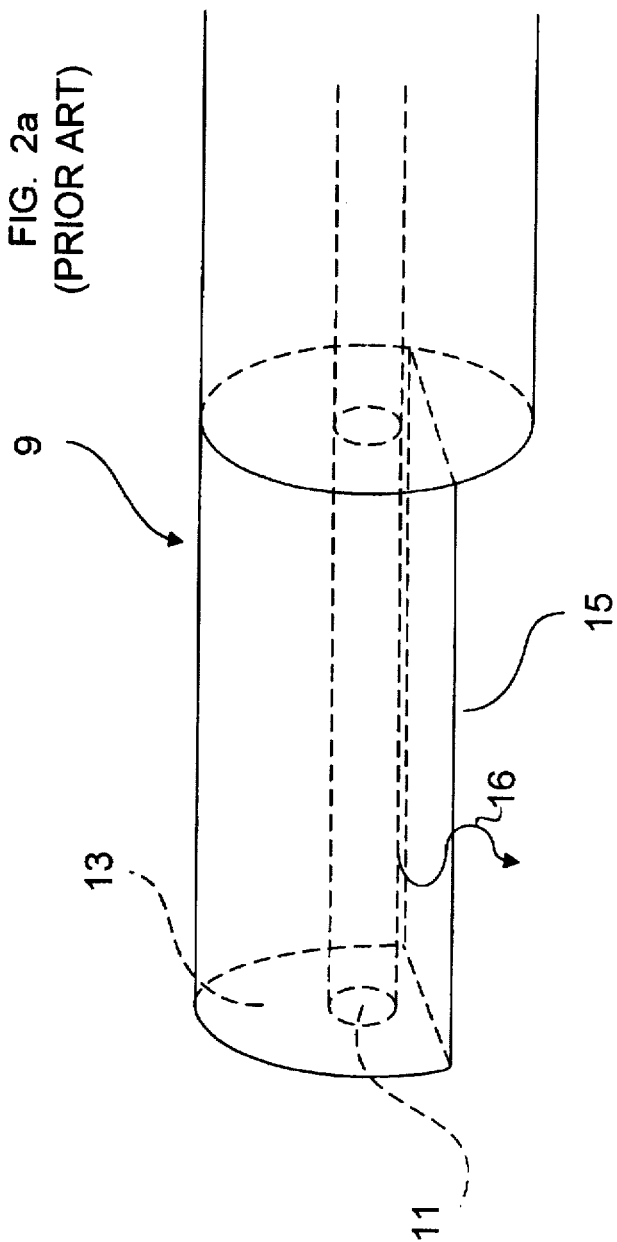
FIG. 2a is an isometric view of a D-fiber in which the cut away portion of the fiber cladding is located at an end of the fiber.
Figure 2B:
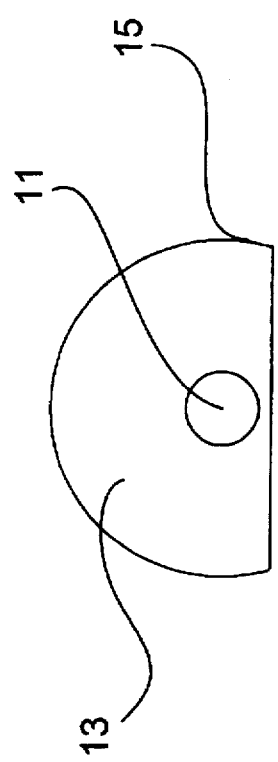
Figure 3:
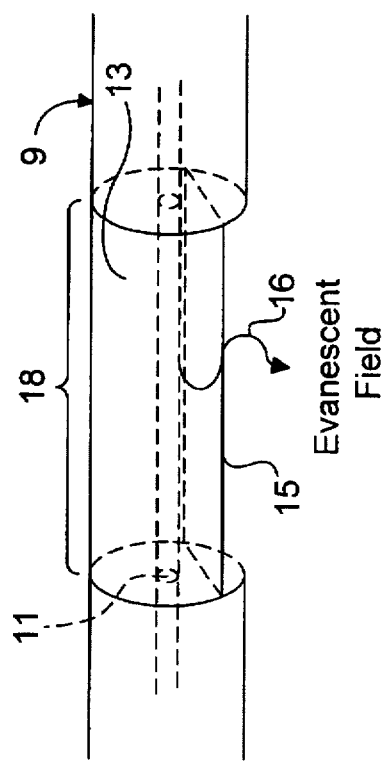
FIG. 3 is an isometric view of a D-fiber in which the cut away portion of the fiber cladding is located at an intermediate position along the fiber.

Recently, a method for coupling light from fiber to fiber has been developed. This method uses a D-fiber which is illustrated in FIGS. 2a, 2b. In a D-fiber, on one side of the fiber 9 a segment of the cladding 13 has been removed at one end of the fiber leaving a flat coupling surface 15 spaced only a small distance from the core 11. Only a small portion of the total length of the fiber is made into a D-fiber. The remainder of the fiber has the cladding intact for low-loss signal propagation. With some of the cladding removed a fractional portion of the light propagating in the fiber is coupled out to the surrounding environment. This is called evanescent light 16. Normally, this would comprise a significant loss of signal from the fiber to the surrounding environs. However, in the conventional D-fiber scheme, introducing a second D-fiber and placing it so that the flat coupling surface of the first D-fiber is in contact with the flat coupling surface of the second D-fiber provides a mechanism to couple light evanescently from one fiber to the other. By using a plurality of D-fibers coupled to a single D-fiber, the optical signal can be coupled with a number of branches. The key to the D-fiber technique is the removal of the cladding which allows the optical signal to be tapped from the original fiber. The second D-fiber provides a way to capture that tapped signal and to preserve it. Instead of removing the cladding from an end of the fiber as shown in FIGS. 2a and 2b a D-fiber can be made by removing an intermediate portion of the cladding as illustrated in FIG. 3.

The invention provides a method which enables the coupling of light from an optical fiber to an OEIC, thereby establishing connectivity between various system blocks. The properties of a D-fiber are used to couple an optical signal to and from an OEIC waveguide.

Figure 4:
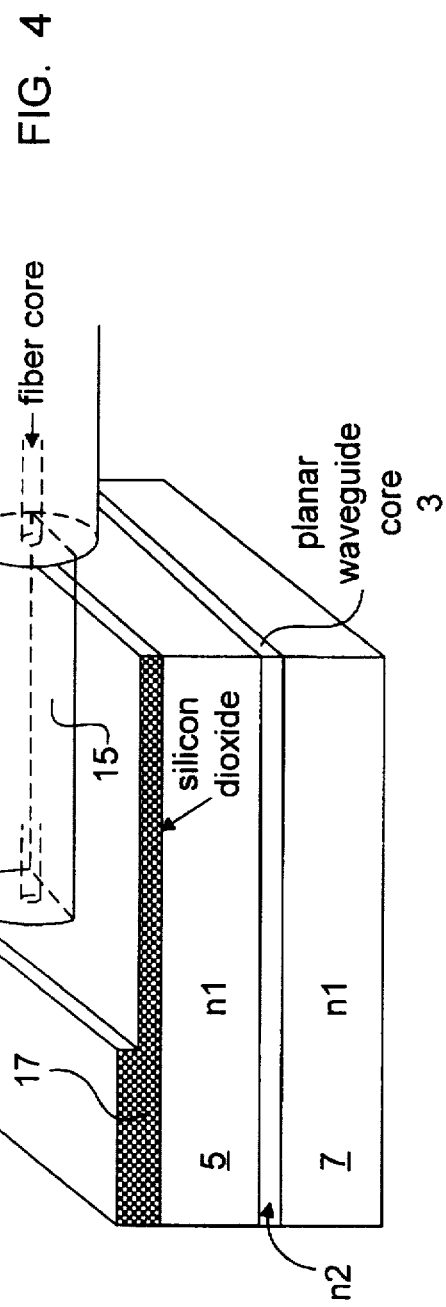
FIG. 4 is an isometric view of a fiber coupled with a planar waveguide according to the method of the invention.

Referring now to FIG. 4, a fiber 9 to be connected to a waveguide 1 of an OEIC is made into a D-fiber over a portion 18 of its length thereby creating coupling surface 15. Typically the portion 18 is at the end of the fiber as shown in FIGS. 2a and 2b, but it could also be at an intermediate position as shown in FIG. 3. The core/cladding of the fiber is typically doped silica/silica. The waveguide 1 includes a core layer 3 and cladding layers 5,7. The waveguide 1 is on a wafer, or forms part of a wafer (not shown). If the waveguide is constructed monolithically, then the core and cladding materials are semiconductor based, such as SiGe/Si. A complete description of such a waveguide is given in applicant's copending U.S. application Ser. No. 08/609930 filed on Feb. 29, 1996 and titled "Semiconductor Optical Waveguide" hereby incorporated by reference. An additional layer of silicon dioxide 17 is, in the embodiment shown, also deposited or overlying the cladding layer 7 of the planar waveguide 1 but this may be omitted in certain circumstances. When present, this silicon dioxide layer 17 together with the cladding layer 7 form the top cladding of the OEIC waveguide. In the illustrated embodiment, the D-fiber 9 is positioned onto the wafer with the flat coupling surface 15 in contact with the silicon dioxide layer 17. The area on the planar waveguide which is in contact with the flat coupling surface 15 of fiber 9 is the planar waveguide coupling surface.

A portion of the waveguide below where the D-fiber is to be placed is preferably designed in such a manner as to be able to preferentially accept (or provide) the evanescent light coupled from (or to) the D-fiber. In the illustrated embodiment, this is achieved by removing a portion of the silicon dioxide layer 17 in a region 19 beneath the D-fiber 9. In areas 21 of the waveguide 1 not below a D-fiber segment, the silicon dioxide layer 17 is thicker and consequently light propagating in these regions does not suffer much attenuation due to evanescent loss.

Figure 6:
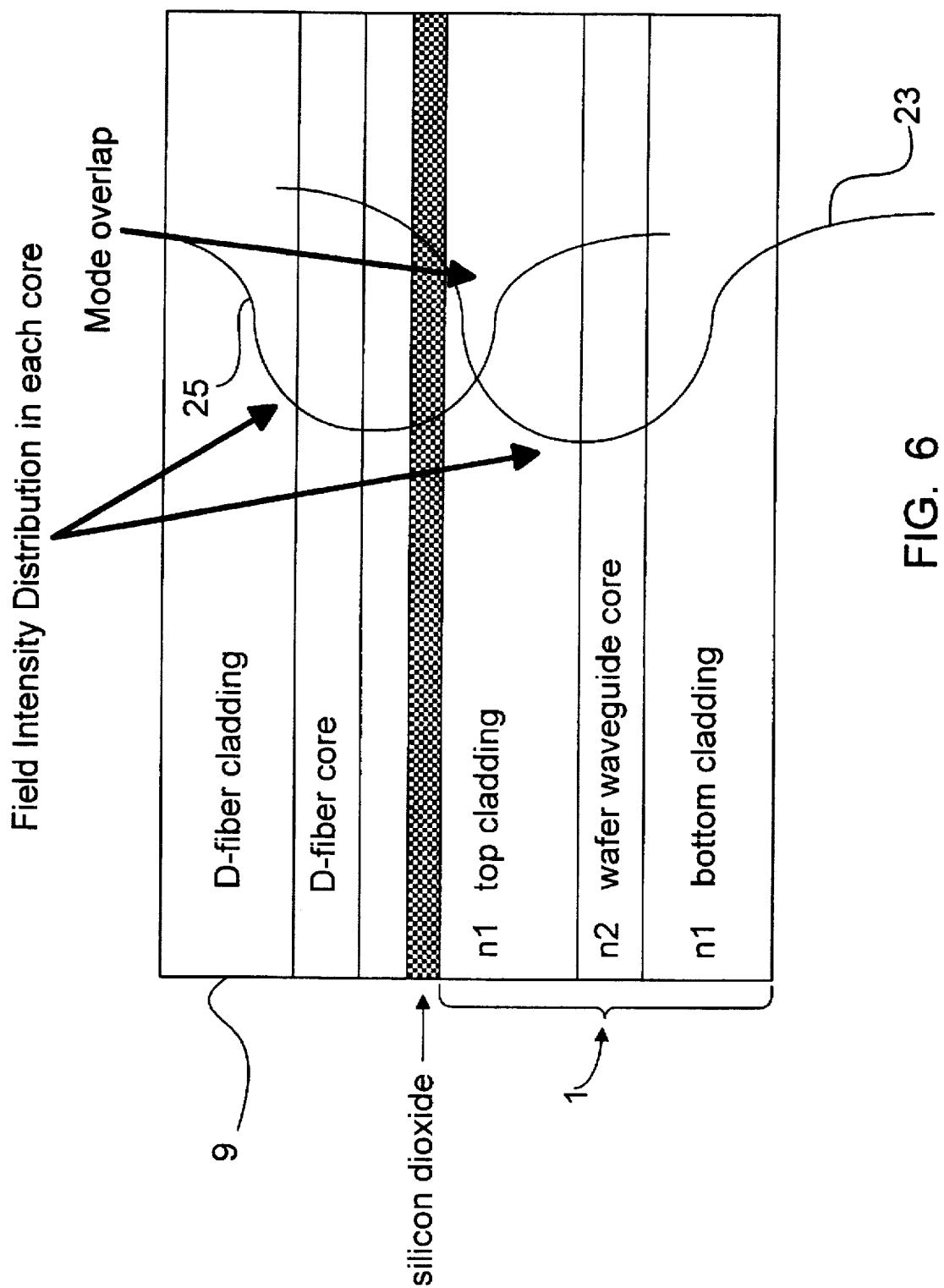
FIG. 6 is a sectional view of a planar waveguide fused with the D-fiber, showing the overlap of the optical modes of the fiber and planar waveguide.

Once the flat coupling surface of a D-fiber is placed into intimate contact with the silicon dioxide, the fiber must be fixed into its final position as discussed further below. It is the overlap of the evanescent fields or the overlap of the respective waveguide modes, which allows light from (or to) the on-wafer waveguide to be coupled to (or from) the D-fiber waveguide. FIG. 6 shows the primary modes of light propagation 23, 25 in an on-wafer waveguide 1 and in a D-fiber 9 installed upon the silicon dioxide layer of the wafer. Due to the overlap of the modes, light is coupled from one waveguide into the other.

The length of fiber 9 placed in contact with the on-wafer waveguide 1 may be referred to as the interaction length. The minimum physical requirement for the interaction length is on the order of a few wavelengths of the light being propagated. This would be a few microns. In practice, the actual interaction length is made much larger than this physical minimum, ranging anywhere from tens of microns to millimeters.

The design of the on-wafer waveguide and fiber including the thickness of the respective core and cladding layers, the wavelength of the light used to propagate signals, and the interaction length are all design parameters which will contribute to the determination of the fractional amount of light that is transferred between the waveguides. Typical exemplary dimensions for the illustrated embodiment in which the planar waveguide is a semiconductor waveguide are 0.1 µm to 5 µm for the thickness of planar waveguide core and 0.1 µm to 10 µm for the thickness of the planar waveguide cladding layers. The silicon dioxide layer has a thickness typically in the range of 1 µm to 10 µm. The distance from the core of the planar waveguide to the coupling surface might be in the range of 0.2 µm to 5 µm, for example.

Exemplary dimensions for the fiber are a core diameter of 4–6 µm for the case of a single-mode fiber and a core diameter up to 60 µm or more for a multi-mode fiber. The total diameter of the core and cladding taken together might be in the range of 100 µm to 125 µm, for example. The distance from the core of the D-fiber to the flat surface of the D-fiber is typically in the range of 1 µm to 10 µm.

Other materials for the planar waveguide and fiber may also be employed. For example, the planar waveguide may be made from a doped silicon dioxide/silicon dioxide structure for the core/cladding, eliminating the need for a separate silicon dioxide layer 17. Typical thicknesses for the layers of such a planar waveguide are 1 µm to 20 µm for the planar waveguide core and 1 µm to 20 µm for the planar waveguide cladding layers. The distance from the core of the planar waveguide to the coupling surface might be in the range of 0.2 µm to 5 µm, for example.

The fiber is preferably made of silica, but it may instead be made other materials such as a combination of plastics or other glasses which provide the required optical confinement.

In selecting the materials, the refractive index of the core of the fiber or planar waveguide must be larger than the refractive index of the respective cladding. It is preferable that the refractive index of the core of the planar waveguide be larger than the refractive index of the cladding of the fiber. Similarly, it is preferable that the refractive index of the fiber core be larger than the refractive index of the planar waveguide cladding.

A number of different methods may be utilized to fix the fiber in place. When the joint to be made is silica on silicon dioxide, with proper surface treatment and subsequent heating, the silica forming the cladding of the D-fiber can be fused to the silicon dioxide layer atop the waveguide. The silica and silicon dioxide from the two elements melds into one continuous form. This is illustrated in FIG. 5. The fusion of the fiber to the wafer may, for example, be carried out by heating the assembly in a chemically inert environment (such as a nitrogen atmosphere) to a temperature ranging from 200 to 800 degrees Celsius for a period ranging from a few seconds to several hours. Once fused, the D-fiber 9 loses all freedom to change position relative to the OEIC and is fixed. At this point, the strength of the fiber attachment can be augmented by reinforcing it with various epoxies or ridged mechanical assemblies.

Alternatively, the fiber may be fixed in place using an adhesive. When this method is employed, it is not necessary to have additional layer 17 for a semiconductor waveguide. Direct fusion bonding of the fiber to a bare semiconductor surface of the waveguide is another recently developed technique which may also be employed. Methods of fusion bonding disparate materials to each other which may be appropriate have been described in a paper by G. G. Goetz, A. M. Fathimulla titled "Heterostructures by Generalized Bonding Techniques", Proceedings of the 177th Meeting of the Electrochemical Society, Montreal, 1990, IEEE Press.

It is noted that the additional silicon dioxide layer 17 is only absolutely necessary when it is desired to use the silica to silicon dioxide fusion technique to bond the fiber to a waveguide which does not have silicon dioxide cladding layer directly overlying its core. The oxide layer may be deposited, for example, by chemical vapour deposition or flame hydrolysis. Alternatively, if the cladding is silicon or a silicon alloy, the oxide may be formed by exposing the wafer to high temperatures in an oxygen environment. This is similar to the LOCOS (local oxidation of silicon) process discussed in applicant's copending U.S. application Ser. No. 08/609930 referred to above.

In the embodiment illustrated in FIG. 4, a portion of the silicon dioxide layer 17 has been removed in order to create a coupling region of the waveguide which preferentially transfers light between the waveguide and the fiber. Depending upon the materials of which the fiber and waveguide are made, various options exist for creating such a region of preferential light transfer. In the case in which cladding layer 5 is silicon dioxide, there is no need for an additional layer of silicon dioxide 17, and a portion of the cladding layer 5 may be removed to create the region of preferential light transfer. In the case in which cladding layer 5 is not silicon dioxide and there is no additional silicon dioxide layer 17, a portion of cladding layer 5 may be removed in the coupling region. In the case in which cladding layer 5 is not silicon dioxide and there is an additional silicon dioxide layer 17, a portion of cladding layer 5 may be removed prior to deposition or formation of the silicon dioxide layer, or a portion of the silicon dioxide layer may be removed as illustrated in FIG. 4. Of course, in each of the above methods, rather than removing a portion of a given layer to create a region of a layer which is thinner, the layer could be built up with different thicknesses such that it is thinner in the coupling region.

A further variant is to start with a semiconductor waveguide with a silicon dioxide layer overlying the top cladding, and then to remove in the region of the coupling surface to be created all of the silicon dioxide layer and a portion of the semiconductor material in the top cladding.

By placing the D-fiber waveguide over an on-wafer waveguide and using the evanescent fields to couple light between the waveguides, a coupling technique has been developed which obviates the requirements of precision horizontal and vertical fiber alignment as in the case of direct coupling or the v-groove technique. The requirement for precise vertical alignment of the core of the fiber with the core of the waveguide so as to allow light to travel directly from the core of the fiber into the core of the waveguide has been eliminated through the use of evanescent fields. Precise horizontal alignment is not an issue in planar waveguides.

It is noted that although the use of this technique minimizes the coupling loss caused by a misalignment of the fiber to the planar waveguide, other sources of coupling loss may still exist. These may include the absorption or scattering of light by dust or distributed residues which are located on the coupling surfaces of the fiber or the waveguide; absorption or scattering by surface irregularities in the coupling regions; and leakage of light from the fiber into the substrate on which the waveguide is formed.

In a second embodiment of the invention, a technique is provided which permits the coupling of light from a fiber to a waveguide having lateral optical confinement. An example of a waveguide having lateral optical confinement is a channel waveguide. Channel waveguides permit the routing of light within an OEIC.

In this embodiment, the same basic apparatus and method of the first embodiment are employed thereby obviating the requirement for precise vertical alignment as discussed previously. However, in this case, the D-fiber must be also placed onto the wafer with a high degree of lateral precision.

Figure 7:
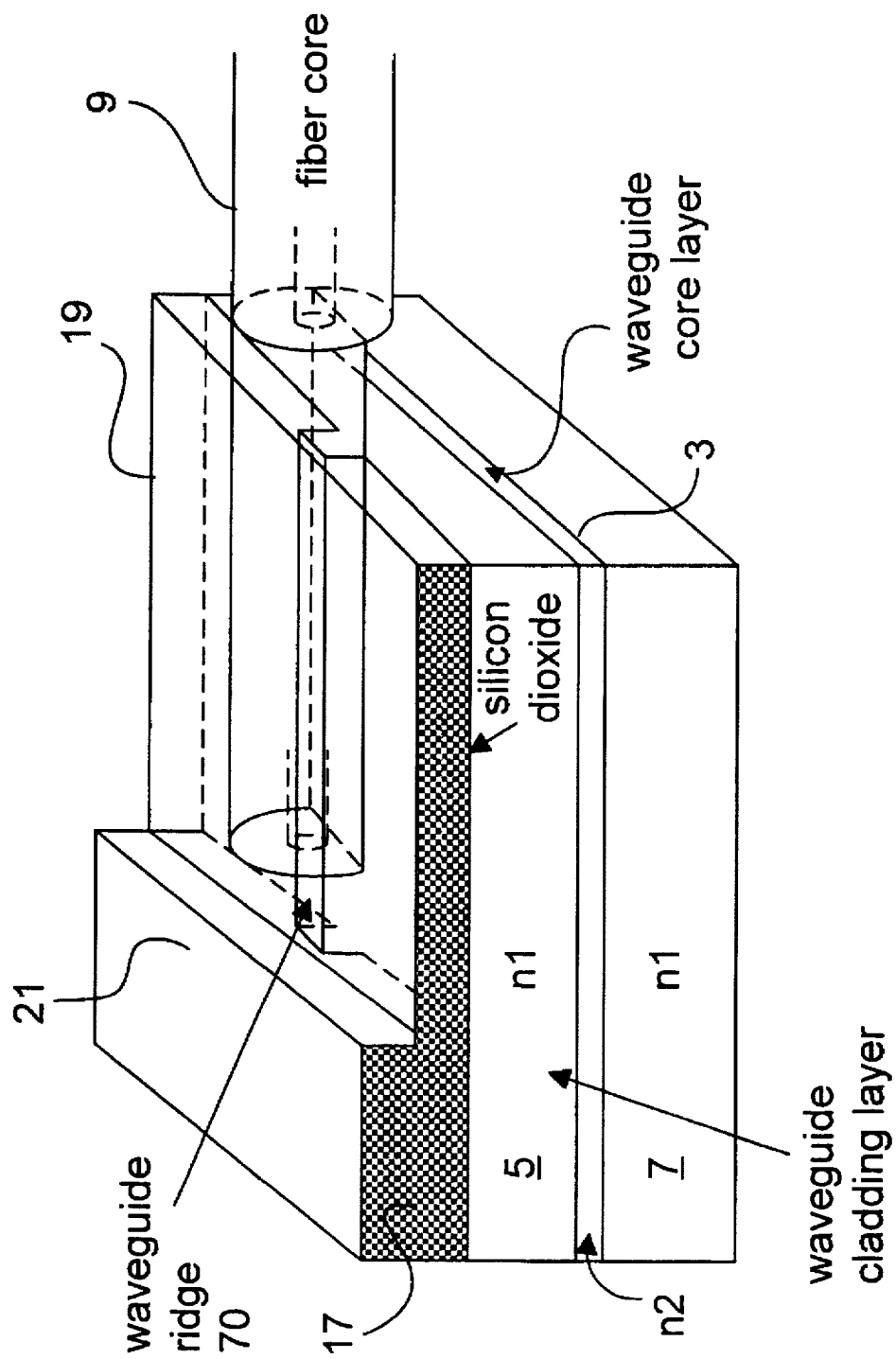
FIG. 7 is an isometric view of a D-fiber coupled with a channel waveguide according to a method of the invention.

FIG. 7 illustrates a fiber 9 and a channel waveguide which are coupled together. The basic layered structure of the channel waveguide is similar to that of FIG. 4 described previously. The channel waveguide has a ridge 70 forming part of cladding layer 5 overlying the core 3, thereby providing lateral optical confinement of light in the core to the region beneath the ridge. In this embodiment, the ridge is etched prior to the formation or deposition of the silicon dioxide layer 17. A portion 19 of the silicon dioxide layer 17 has been removed in the coupling region. This removed portion 19 may or may not extend all the way down to the ridge 70.

The attachment of the fiber 9 to the waveguide is done using the methods described previously for the first embodiment. FIGS. 8a and 8b illustrate in cross sectional view the D-fiber and channel waveguide before and after they have been joined.

Other types of channel waveguide may alternatively be employed. For example, strip loaded waveguides may be used wherein a strip of material having an index of refraction higher than the existing cladding of the structure is deposited over the region where the channel waveguide is to be formed. Alternatively, the channel may be formed by diffusing or implanting a dopant or alloying element into the substrate in regions which have the shape of the waveguide to be formed. If the cladding is silicon or silicon alloy, then LOCOS regions may be employed to define channel waveguides as described in detail in applicant's copending U.S. application Ser. No. 08/609930 referred to above. Similar options for the materials and options used for the construction of the fiber and waveguide exist for this embodiment as those described above for the previous embodiment.

Lateral alignment features on the wafer may be created using photolithography and etching techniques and can be used to bring the D-fiber waveguide into precise lateral alignment with the on-wafer waveguide. For example, a shallow pit may be etched in the silicon dioxide layer where the fiber is to be placed. As an another example, a number of posts or pillars on the wafer may be fabricated between which the fiber must fit. Lateral positioning should ideally be achieved to within 1 micron or less.

Alternatively, the construction of the on-wafer waveguide can be such that it is tapered to allow the D-fiber to be placed with relaxed lateral tolerances.

In another variant, the D-fiber is placed slightly angled to and crossing the on-wafer channel waveguide. In this method, a fractional portion of the D-fiber overlies the channel waveguide so as to permit the coupling of the optical signal into the on-wafer waveguide. However, that portion of the D-fiber not overlying the channel waveguide may continue to lose optical energy to the wafer. This energy is lost and constitutes another portion of the coupling loss.

Although particular embodiments of the invention have been described in detail, numerous modifications, variations and adaptations may be made without departing from the scope of the invention.

We claim:

1. An optically coupled arrangement comprising:
   an optical waveguide on an opto-electronic integrated circuit, the waveguide having a core, a first cladding underlying the core and a second cladding overlying the core, the second cladding having a first coupling surface;
   an optical fiber having a core and a cladding and having a portion of the cladding removed along the length of the fiber to form a second coupling surface, the second coupling surface being held in contact with the first coupling surface;
   whereby light propagating in either of the fiber or the waveguide is evanescently coupled between the fiber and the waveguide.

2. The optically coupled arrangement of claim 1 wherein a portion of the second cladding of the waveguide is thinner beneath the first coupling surface than elsewhere.

3. The optically coupled arrangement of claim 2 wherein the waveguide is a semiconductor waveguide.

4. The optically coupled arrangement of claim 3 wherein the second cladding comprises in sequence a semiconductor layer overlying the core of the waveguide and a silicon dioxide layer on which the first coupling surface is located.

5. The optically coupled arrangement of claim 4 wherein said optical fiber is a silica fiber.

6. The optically coupled arrangement of claim 5 wherein the first and second coupling surfaces are fused together.

7. The optically coupled arrangement of claim 4 wherein said portion of the second cladding which is made thinner is in said silicon dioxide layer.

8. The optically coupled arrangement of claim 4 wherein said portion of the second cladding which is made thinner is in said semiconductor layer.

9. The optically coupled arrangement of claim 4 wherein the first and second coupling surfaces are fused together.

10. The optically coupled arrangement of claim 3 wherein the first and second coupling surfaces are held together with adhesive.

11. The optically coupled arrangement of claim 2 wherein the first waveguide is a channel waveguide.

12. The optically coupled arrangement of claim 11 wherein the channel waveguide is tapered such that it is wider where the fiber is to be coupled, thereby reducing sensitivity to lateral placement of the fiber.

13. The optically coupled arrangement of claim 11 wherein the fiber is fused to the waveguide at an angle in the plane of the waveguide with respect to the core of the fiber, thereby reducing sensitivity to lateral placement of the fiber.

14. The optically coupled arrangement of claim 2 wherein said optical fiber is a silica fiber.

15. The optically coupled arrangement of claim 14 wherein the first and second coupling surfaces are fused together.

16. The optically coupled arrangement of claim 2 wherein the first and second coupling surfaces are held together with adhesive.

17. The optically coupled arrangement of claim 2 wherein the waveguide is a silicon dioxide waveguide.

18. The optically coupled arrangement of claim 2 wherein the cladding of the waveguide has an index of refraction which is less than that of the core of the fiber, and wherein the cladding of the fiber has an index of refraction which is less than that of the core of the waveguide.

19. The optically coupled arrangement of claim 1 wherein the waveguide is a semiconductor waveguide.

20. The optically coupled arrangement of claim 1 wherein the first and second coupling surfaces are held together with adhesive.

21. The optically coupled arrangement of claim 1 wherein the waveguide is a silicon dioxide waveguide.

22. A method of making an optical coupling between
   a) an optical waveguide on an opto-electronic integrated circuit having a core, a first cladding underlying the core and a second cladding overlying the core, the second cladding having a first coupling surface; and
   b) an optical fiber having a core and a cladding;
   comprising the steps of:
   removing a portion of the cladding of the fiber along its length to form a second coupling surface;
   attaching the fiber to the waveguide such that the first coupling surface is held in contact with the second coupling surface.

23. The method according to claim 22 wherein the second cladding of the waveguide initially comprises a semiconductor layer, further comprising the step of:
   depositing or forming a silicon dioxide layer on the semiconductor layer, the silicon dioxide layer thereby becoming part of the second cladding.

24. The method according to claim 23 further comprising the step of removing a portion of the semiconductor layer of the second cladding of the waveguide beneath the first coupling surface before depositing or forming the silicon dioxide layer.

25. The method according to claim 23 further comprising the step of
   removing a portion of the silicon dioxide layer of the waveguide to create the first coupling surface.

26. The method according to claim 22 further comprising the step of:
   removing a portion of the second cladding of the waveguide to create the first coupling surface.

27. The method according to claim 22 wherein the step of attaching the fiber to the waveguide comprises the step of fusing the fiber to the waveguide.

28. The method according to claim 22 wherein the fiber is a silica fiber, and further comprising the step of fusing the fiber to the waveguide.

29. The method according to claim 22 wherein the waveguide is a channel waveguide and wherein the step of attaching the fiber to the waveguide comprises the step of fusing the fiber to the waveguide at an angle in the plane of the first waveguide with respect to the core of the fiber.

30. The method according to claim 22 wherein the waveguide is a channel waveguide, further comprising the step of defining the channel waveguide by etching a ridge in the second cladding layer.

31. The method according to claim 22 wherein the second cladding of the waveguide initially comprises a semiconductor layer, further comprising the step of:
   depositing or forming a silicon dioxide layer on the semiconductor layer;
   removing the entire silicon dioxide layer and a portion of the semiconductor layer to create the first coupling surface.

* * * * *